Figure 1:
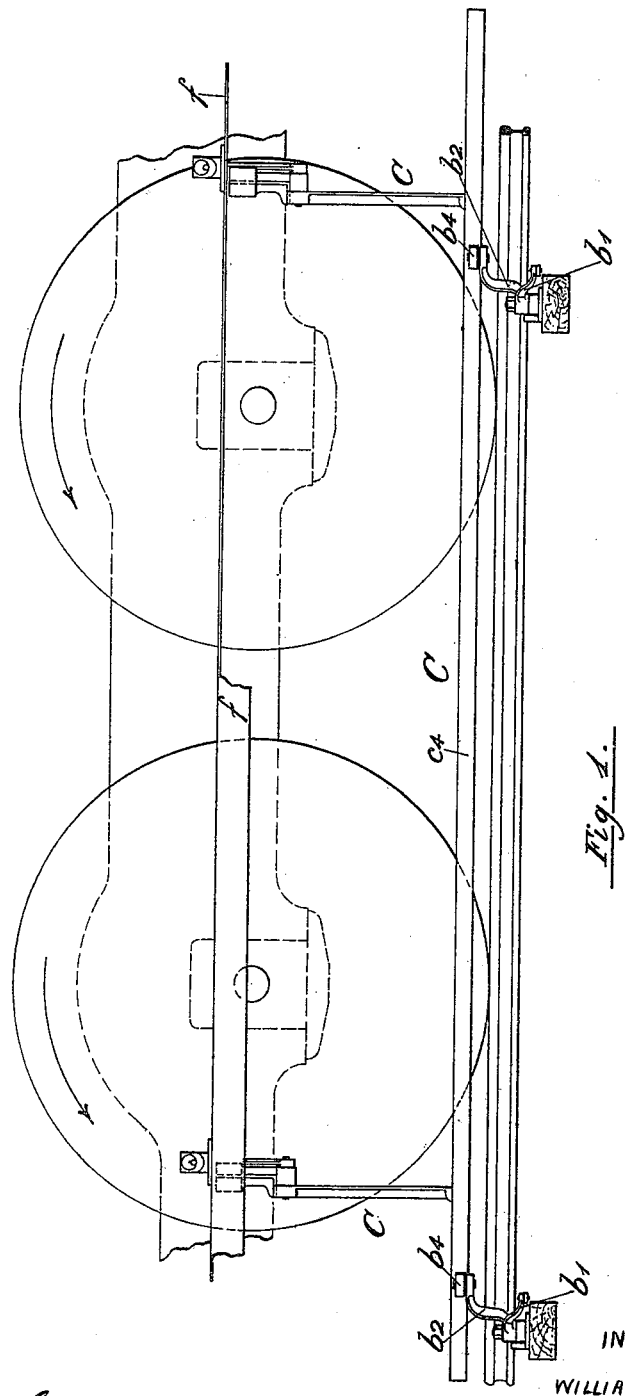

No. 670,137. Patented Mar. 19, 1901.
W. P. MARA & E. H. COZENS-HARDY.
SIGNALING APPARATUS FOR RAILWAYS, &c.
(Application filed Jan. 9, 1901.)
(No Model.) 6 Sheets—Sheet 1.

WITNESSES:

INVENTORS
WILLIAM PATRICK MARA
EDWARD HERBERT COZENS-HARDY
BY
THEIR ATTORNEYS.

No. 670,137. Patented Mar. 19, 1901.
W. P. MARA & E. H. COZENS-HARDY.
SIGNALING APPARATUS FOR RAILWAYS, &c.
(Application filed Jan. 9, 1901.)
(No Model.) 6 Sheets—Sheet 2.

WITNESSES:
F. W. Wright
J. C. Connor

INVENTORS
WILLIAM PATRICK MARA
EDWARD HERBERT COZENS-HARDY
BY Howson and Howson
THEIR ATTORNEYS.

No. 670,137. Patented Mar. 19, 1901.
W. P. MARA & E. H. COZENS-HARDY.
SIGNALING APPARATUS FOR RAILWAYS, &c.
(Application filed Jan. 9, 1901.)
(No Model.) 6 Sheets—Sheet 3.

WITNESSES:
F. W. Wright
S. C. Connor

INVENTORS
WILLIAM PATRICK MARA
EDWARD HERBERT COZENS-HARDY
BY Howtar and Howtar
THEIR ATTORNEYS.

No. 670,137. Patented Mar. 19, 1901.
W. P. MARA & E. H. COZENS-HARDY.
SIGNALING APPARATUS FOR RAILWAYS, &c.
(Application filed Jan. 9, 1901.)
(No Model.) 6 Sheets—Sheet 4.

WITNESSES:
F. W. Wright
A. C. Connor

INVENTORS
WILLIAM PATRICK MARA
EDWARD HERBERT COZENS-HARDY
BY Howson and Howson
THEIR ATTORNEYS.

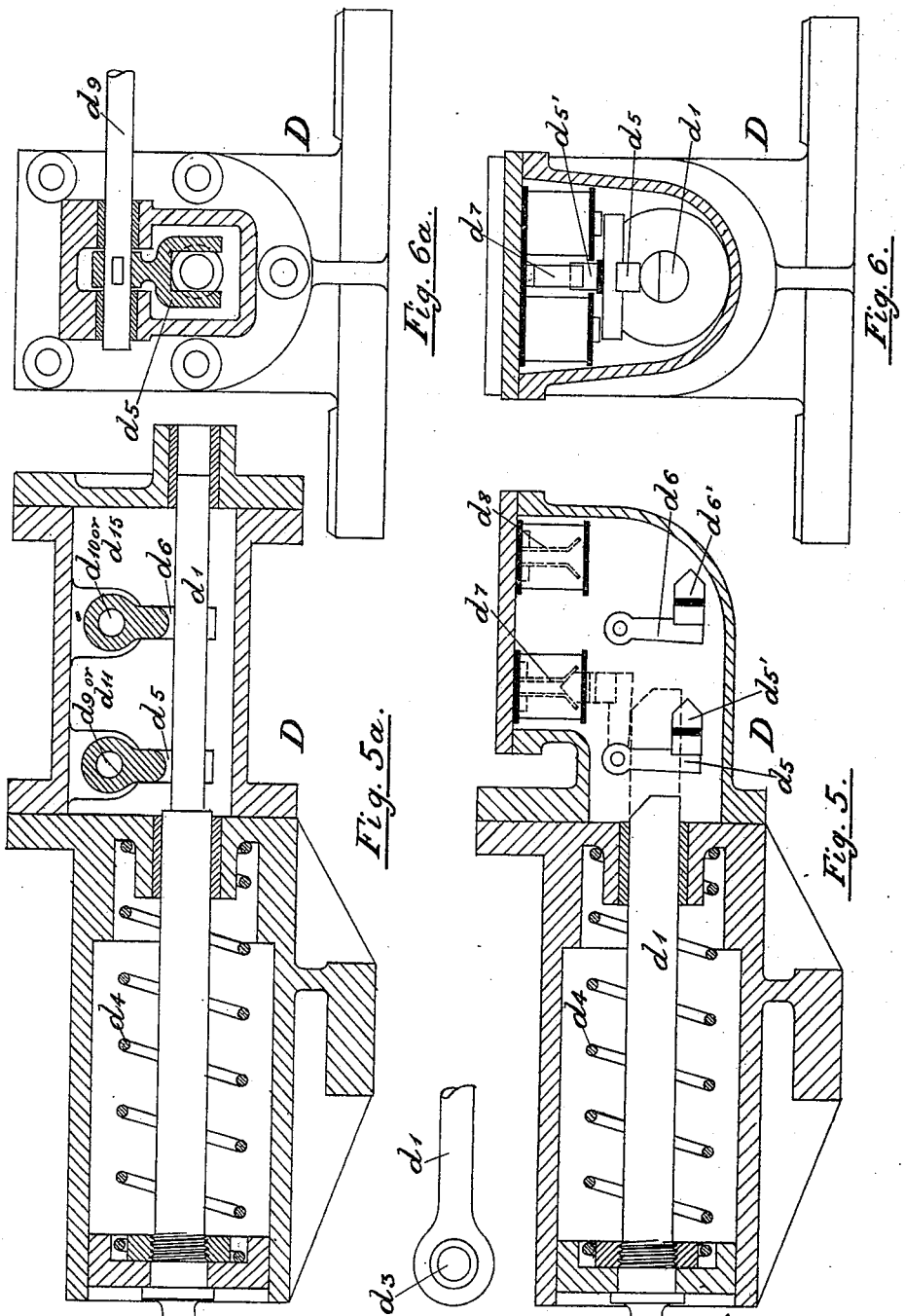

No. 670,137. Patented Mar. 19, 1901.
W. P. MARA & E. H. COZENS-HARDY.
SIGNALING APPARATUS FOR RAILWAYS, &c.
(Application filed Jan. 9, 1901.)
(No Model.) 6 Sheets—Sheet 6.
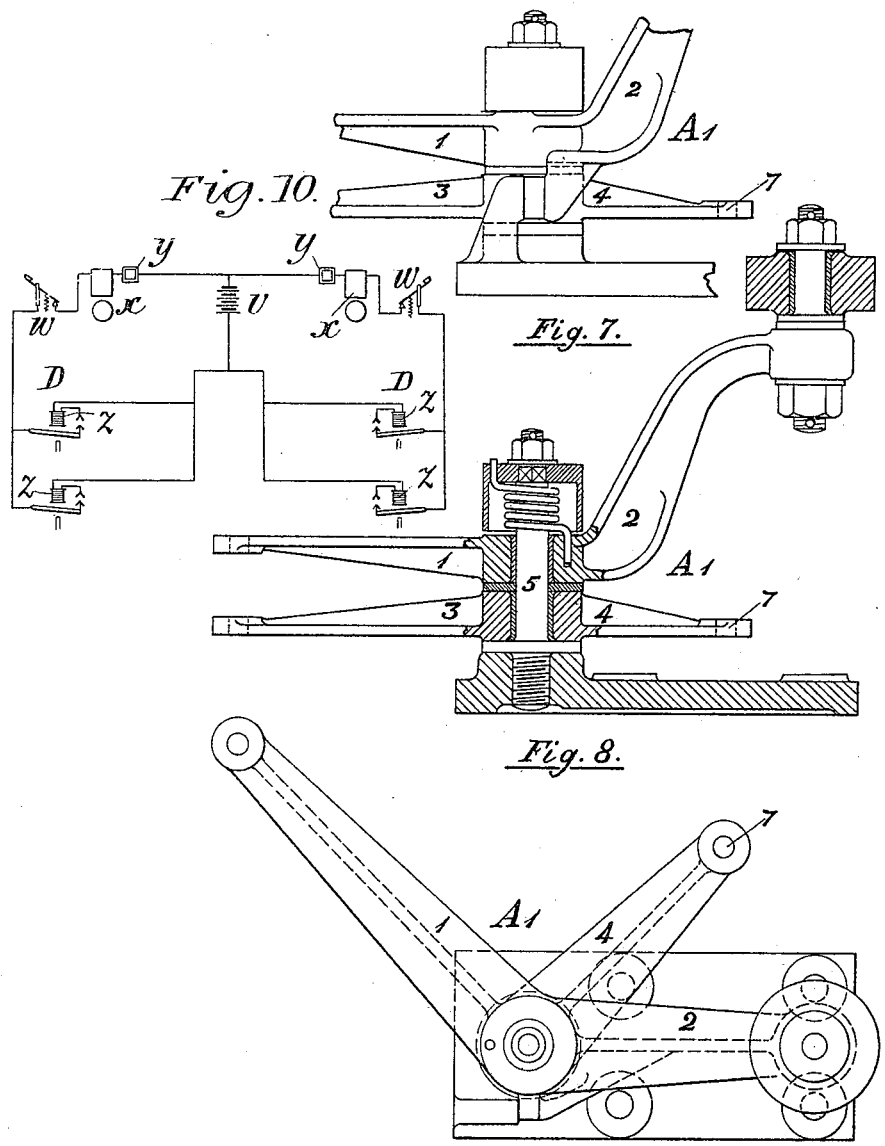
INVENTORS
WILLIAM PATRICK MARA
EDWARD HERBERT COZENS-HARDY
BY Howson and Howson
THEIR ATTORNEYS
WITNESSES:
F. W. Wright
S. C. Connor

UNITED STATES PATENT OFFICE.

WILLIAM PATRICK MARA, OF WESTCLIFF-ON-SEA, AND EDWARD HERBERT COZENS-HARDY, OF WESTMINSTER, ENGLAND, ASSIGNORS OF ONE-THIRD TO BERNARD WILSHIRE TOLHURST, OF SOUTHEND-ON-SEA, ENGLAND.

SIGNALING APPARATUS FOR RAILWAYS, &c.

SPECIFICATION forming part of Letters Patent No. 670,137, dated March 19, 1901.

Application filed January 9, 1901. Serial No. 42,630. (No model.)

*To all whom it may concern:*

Be it known that we, WILLIAM PATRICK MARA, a resident of St. Ursulas, Clifton Drive, Westcliff-on-Sea, in the county of Essex, and EDWARD HERBERT COZENS-HARDY, a resident of 82 Victoria street, in the city of Westminster, England, subjects of the Queen of Great Britain and Ireland, have invented certain new and useful Improvements in Signaling Apparatus for Railways and the Like, which invention is fully set forth in the following specification.

This invention relates to signaling apparatus to be used on railways, tramways, and the like, especially during foggy weather.

The chief object of this invention is by mechanical means to operate, in conjunction with the usual lever working an ordinary semaphore, signal apparatus—such as bells, (electric or otherwise,) whistles, or small semaphores, or both—placed in a convenient position in the cab of an engine, so as to enable the driver to know the position of the ordinary semaphore-signal though unable to see it and so that when stopped by a signal at "danger" he may know at once when it is pulled into "line clear" position and he is authorized to go on.

In order that this invention and the manner in which the same is to be performed may be readily understood, we will describe the same with reference to the accompanying drawings, in which—

Figure 2:
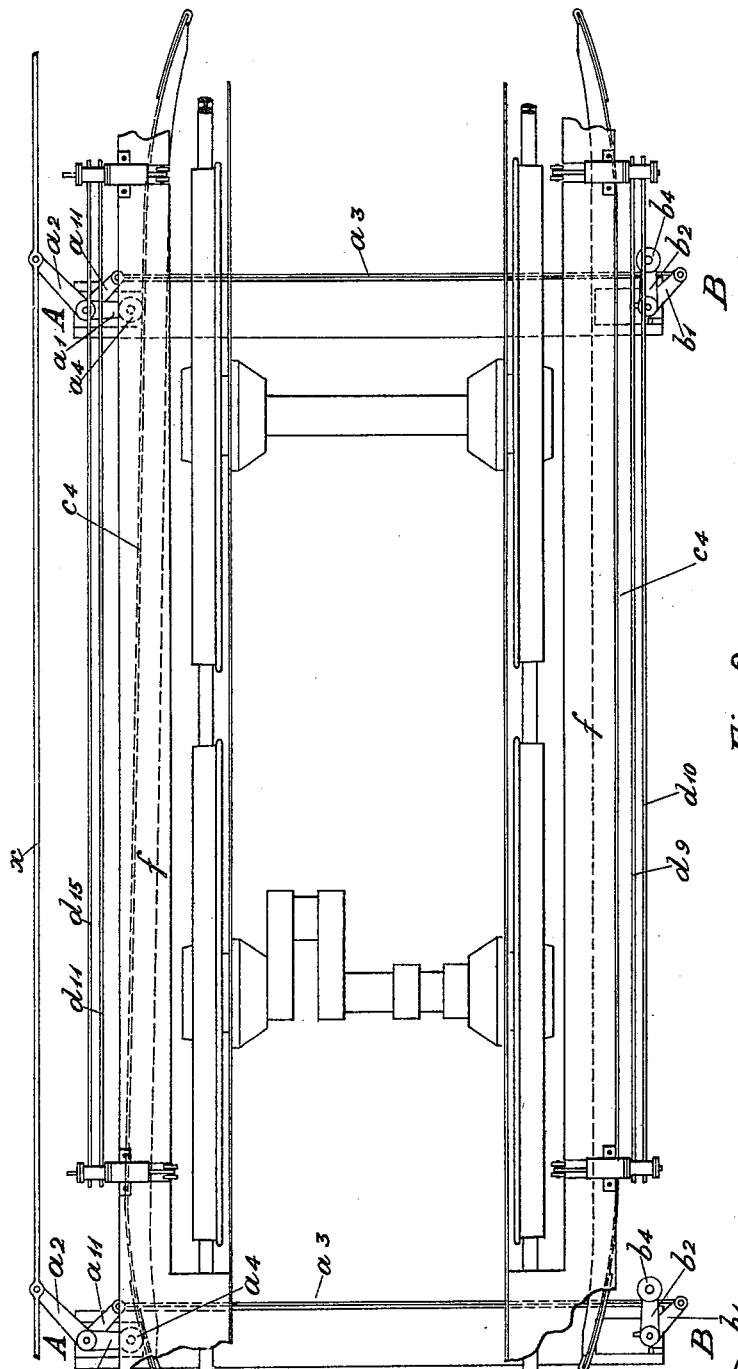
Figure 3:
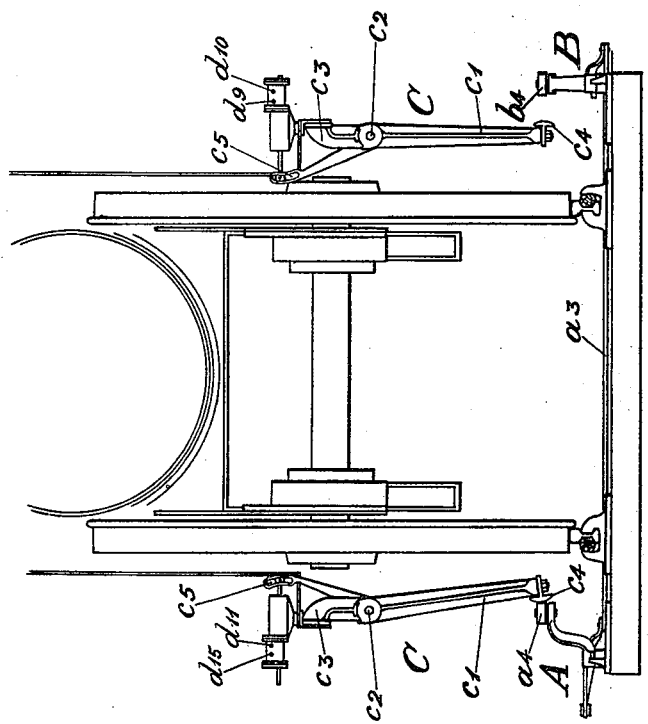
Figure 4:
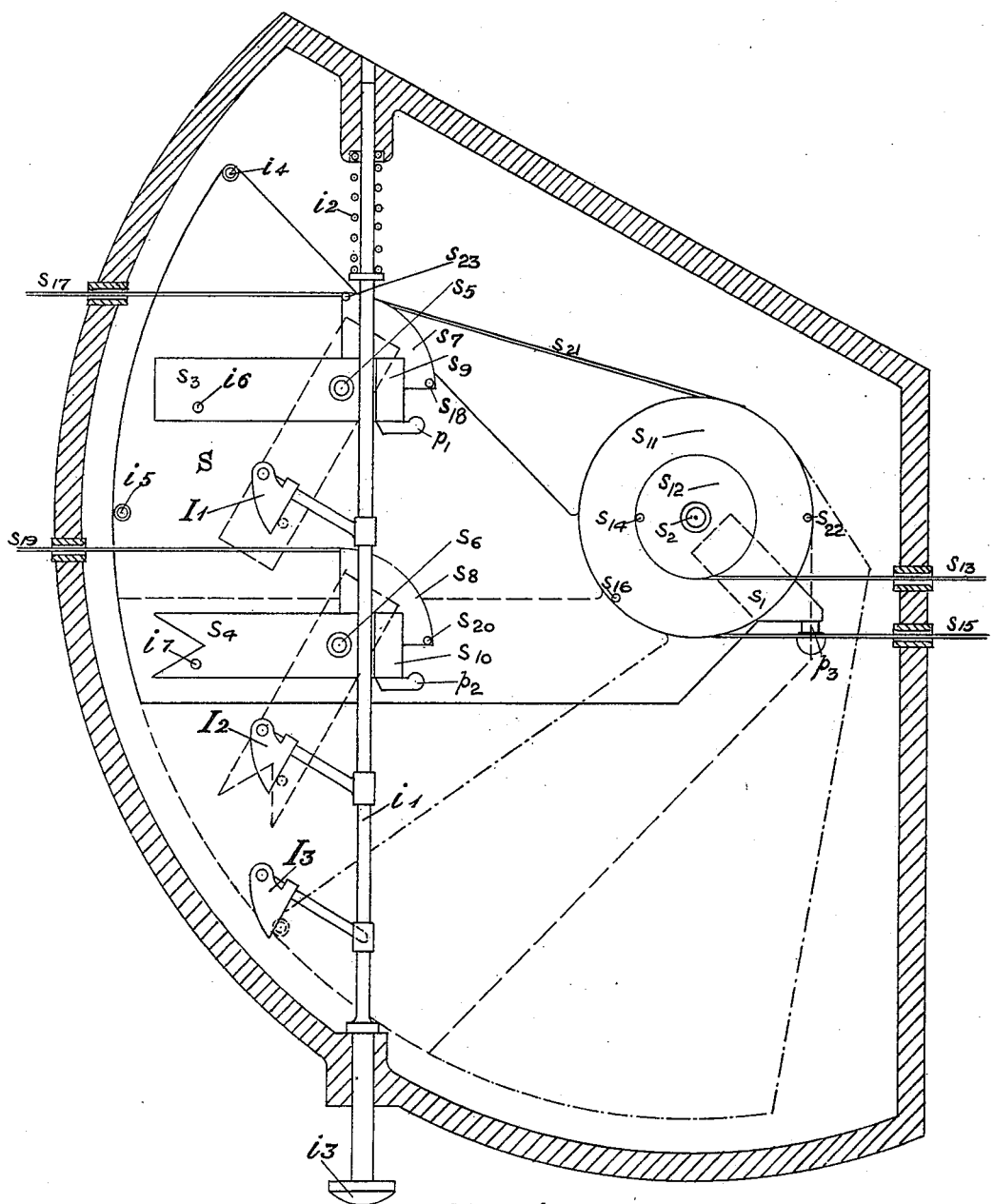

Figure 1 is a side elevation of part of a locomotive and permanent way fitted with apparatus in accordance with this invention. Fig. 2 is a plan of two "projecting pieces," two pairs of bell-cranks, and part of an engine, the foot-plate in one position being removed. Fig. 3 is a front elevation of part of a locomotive and permanent way fitted with apparatus according to this invention and showing a pair of bell-cranks when the ordinary semaphore-signal is at "danger." Fig. 4 is a view showing a convenient arrangement of semaphore-signals in the cab. Figs. 5 and 6 are longitudinal and transverse sections of a plunger apparatus. Figs. 5$^a$ and 6$^a$ are longitudinal and transverse sections of a plunger apparatus, such as that shown in Figs. 5 and 6, adapted to work small semaphores in lieu of electric wires. Figs. 7, 8, and 9 show in elevation, section, and plan a bell-crank suitable for use when it is required at times to make the system inoperative. Fig. 10 is a diagram illustrating the arrangement of the electric circuits on the locomotive.

Like letters indicate like parts throughout the figures.

In the neighborhood of the usual semaphore-signal is placed near the rails, conveniently on sleepers, a bell-crank or a pair, or, preferably, as shown in the figures, a series of pairs of bell-cranks A B. When a series of pairs of bell-cranks is used, the distance between consecutive pairs of bell-cranks should be something less than the length of the contact-making bars of the projecting pieces, hereinafter described, carried by the locomotive.

In each pair A B of bell-cranks one arm—*e. g.*, at $a''$—of the bell-crank A is connected by the rod or link $a^3$ to the arm $b'$ of the bell-crank B. The contact-arm $a'$ of each bell-crank A carries a roller $a^4$, intended when put in position to press against and deflect the contact-bar $c^4$ of one of the projecting pieces C, hereinafter described, and similarly the contact-arm $b^2$ of each bell-crank B carries a roller $b^4$, intended when put in position to press against the contact-bar $c^4$ of the other projecting piece C, hereinafter described. The arms $a^2$ of the consecutive bell-cranks A are connected to a rod or other equivalent $x$, which may be worked by an independent lever or by the same lever in the signal-box which operates the usual semaphore-signal, so that when the man in the box operates the lever he puts all the bell-cranks A in the same position—*e. g.*, "danger"—and all the bell-cranks B in the opposite position, and vice versa.

As hereinafter explained, the throw of the arms $a'$ and $b^2$ of the bell-cranks A and B, respectively, may be of different amount, according as the signal to be indicated is a "distant" or "home" signal.

C C are the two projecting pieces carried by the engine. Each projecting piece C consists of rocking levers $c'$ $c'$, pivoted at $c^2$ $c^2$ on brackets $c^3$ $c^3$, the lower ends of the rocking lever $c'$ $c'$ being attached to the contact-bar $c^4$, which should be as long as convenient, with the object of minimizing the number of pairs of bell-cranks A B necessary for the proper working of the system. Each projecting piece C is so disposed that when it is in the neighborhood of a series of bell-cranks A or B, as the case may be, with their contact-arms $a'$ or $b^2$ in position to deflect it it will be thereby deflected, and the free arm of one or both of the levers $c'$ $c'$ may by suitable means—e. g., by completing an electric-bell circuit—be made to communicate an audible or visible signal or signals (or both audible and visible signals) in the cab of the engine or elsewhere, which may in the case of one projecting piece indicate "danger," and in the case of the other projecting piece may indicate "line clear." By arranging the throw of the bell-cranks A and B, and consequently the amount of deflection of the projecting piece C C, differently at a distant and a home ordinary semaphore-signal position, different signals may be operated in the cab of the engine, thus informing the driver whether he is in the neighborhood of the usual distant or home semaphore signal position in addition to communicating to him the information "danger" or "line clear," as the case may be. With the object of communicating different signals at the usual distant and home semaphore signal positions there may be employed a piece of apparatus D, Figs. 5 and 6, carried in duplicate, as shown in the figures, on each side of the engine, and working, as hereinafter explained, in conjunction with the slotted free arms of the levers $c'$ $c'$. The apparatus D may conveniently be carried on the foot-plate $f$.

$d'$ $d'$ $d'$ represent a plunger connected by a pin $d^3$ and slot $c^5$, Fig. 3, to the free arm of the rocking lever $c'$.

$d^4$ is a strong spiral spring keeping the plunger $d'$ $d'$ $d'$ in its normal position when the projecting piece C is not acted upon by any one or more of the bell-cranks A or B.

$d^5$ and $d^6$ are levers pivoted to brackets carried by the end pieces of the outer casing of the apparatus. The pivoted lever $d^5$ carries a plug $d^{5\prime}$, and similarly the pivoted lever $d^6$ carries a plug $d^{6\prime}$. The plugs $d^{5\prime}$ and $d^{6\prime}$, which may be made of metal, are provided for the purpose of completing electrical circuits when pushed by the plunger $d'$ $d'$ $d'$ into the sockets $d^7$ and $d^8$, respectively, by means of which circuits bells may be rung in the cab of the engine and signals so communicated to the driver. It is to be observed that when the plunger $d'$ $d'$ $d'$ is pushed by the free arm of the rocking lever $c'$ into the position shown by the dotted lines only the pivoted lever $d^5$ will be moved, as shown in dotted lines, and the particular signal controlled by the lever $d^5$ will be operated, whereas if the plunger $d'$ $d'$ $d'$ be pushed farther in the same direction both pivoted levers $d^5$ and $d^6$ will be moved and both signals controlled by them, respectively, will be operated. It is to be further observed that the distance to which the plunger $d'$ $d'$ $d'$ is pushed by the free arm of the rocking lever $c'$ depends upon the throw of the bell-cranks A or B, which are arranged to bear upon the contact-bar $c^4$ of the particular projecting piece C in conjunction with which the particular piece of apparatus D works. The bell-cranks A and B, working in the neighborhood of a distant-signal position, may be such that the contact-arms $a'$ and $b^2$ have such a throw as will push the plunger $d'$ $d'$ $d'$ of the respective apparatus D controlled by them sufficiently far only as to operate the signal or signals controlled by the lever $d^5$, and the bell-cranks A and B, working in the neighborhood of a home-signal position, may be such that the contact-arms $a'$ and $b^2$ have such a throw as will push the plunger $d'$ $d'$ $d'$ of the respective particular apparatus D controlled by them sufficiently far as to operate the signal or signals controlled by the lever $d^6$ in addition to that controlled by the lever $d^5$.

Fig. 10 shows a convenient arrangement of circuits which may be employed and which will be clearly understood from the following description: When the contact in the plunger apparatus D is made, a circuit is completed through the bell and indicator $x$ $y$ in the cab of the engine and through the electromagnet $z$, to which the contact-tappet forms an armature. Until the circuit is broken the magnet will hold up the tappet and the bell in the engine will continue ringing until the circuit is broken by the engine-driver touching the switch $w$ in the cab, which breaks the circuit, demagnetizes the magnet, and allows the tappet in the plunger apparatus to fall. The switch in the cab has a spring, so that the circuit is always closed through it except when the switch is pressed by the engine-driver. $v$ indicates the battery for supplying electric current. The arrangement on one side is for "danger" and on the other for "line clear."

The levers $d^5$ and $d^6$ may obviously (see Figs. 5$^a$ and 6$^a$) be used to operate, in addition to or in lieu of electric circuits, mechanical devices, whereby signaling apparatus— e. g., an arrangement of small semaphores, such as is shown in Fig. 4.

S is a screen, attached to the balance-weight $s'$, movable about the center $s^2$ and so shaped that when in the normal position (shown in full lines) it conceals the two small semaphores $s^3$ and $s^4$; but when moved into the positions indicated by dash-lines or by dash-and-dot lines one or both of the small semaphores $s^3$ and $s^4$ is or are exposed to view, as the case may be. The balance-weight $s'$ brings the screen S into normal position against the stop $p^3$ immediately it is released from either of the positions shown by the dash or dash-anddot lines. The two small semaphores $s^3$ and $s^4$ are centered at $s^5$ and $s^6$, respectively, and are provided with balance-weights $s^9$ and $s^{10}$, encountering stops $p'$ and $p^2$. $s^7$ and $s^8$ are sectors, also centered at $s^5$ and $s^6$ and fixed to the small semaphores $s^3$ and $s^4$, respectively.

The circular parts $s^{11}$ and $s^{12}$ of the screen S and the sectors $s^7$ and $s^8$ are grooved for the purpose of carrying and guiding the cords or other suitable connections, hereinafter referred to as "cords." The cord $s^{15}$ is attached at $s^{16}$ and the cord $s^{13}$ is attached at $s^{14}$ to the respective circular parts of the screen. The cord $s^{17}$ is attached at $s^{18}$ and the cord $s^{19}$ is attached at $s^{20}$ to the sectors of the respective small semaphores. The cord $s^{21}$ is attached at $s^{22}$ and $s^{23}$ on the circular part $s^{11}$ and sector $s^7$, respectively. The relative distances of the respective points of attachment of the above-mentioned cords from the centers about which the parts operated by them respectively turn are so arranged as to get the relative angle of movement required in the screen S and small semaphores $s^3$ $s^4$ to expose the small semaphores in the positions desired as and when the cords $s^{13}$, $s^{15}$, $s^{17}$, or $s^{19}$ are pulled to give particular signals, as is hereinafter explained.

At the distant-signal positions on the permanent way a fixed bell-crank or equivalent is placed in such position and of such dimensions that it will operate the particular projecting piece C used for the purpose of communicating danger-signals and the levers $d^6$ in connection therewith. The function of this fixed bell-crank or equivalent is to insure (as hereinafter indicated) the screen S being pulled to the full extent shown by the dash-and-dot lines and so at a distant-signal position to disclose both small semaphores $s^3$ and $s^4$, whether they be in the danger or the line-clear position. At a distant-signal position on the permanent way the driver may read the semaphore $s^4$ as the ordinary "distant" signal and the semaphore $s^3$ as the ordinary "home-repeat" signal.

As shown in Figs. 5$^a$, 6$^a$, and 2, the apparatuses D which are worked by the particular projecting piece C which is deflected by the bell-cranks A and used for the purpose of indicating danger-signals, have the levers $d^5$ keyed to the rod $d^{11}$ and the levers $d^6$ keyed to the rod $d^{15}$, and the apparatuses D which are worked by the particular projecting piece C which is deflected by the bell-cranks B and is used for the purpose of indicating line-clear signals have the levers $d^5$ keyed to the rod $d^9$, Fig. 2, and the levers $d^6$ keyed to the rod $d^{10}$. The cord $s^{13}$ is joined to the rod $d^{15}$ by an intermediate crank or intermediate cranks. The cord $s^{15}$ is joined to the rod $d^{11}$ by an intermediate crank or intermediate cranks. The cord $s^{17}$ is joined to the rod $d^{10}$ by an intermediate crank or intermediate cranks, and the cord $s^{19}$ is joined to the rod $d^9$ by an intermediate crank or intermediate cranks. When at a distant-signal position, the cord $s^{13}$ alone is pulled through the instrumentality of a fixed bell-crank or equivalent, together with the particular projecting piece C used for danger-signals and its plunger apparatuses D and rod $d^{15}$, the screen S will be lowered to the position shown by dash-and-dot lines, and the two semaphores will be exposed both in danger position. Similarly when the cord $s^{15}$ alone is (through the instrumentality of a bell-crank or bell-cranks A) pulled at a home-signal position the screen S will be lowered to the position shown by dash-lines and the home semaphore $s^3$ alone will be exposed in danger position. In like manner when the cord $s^{17}$ is (through the instrumentality of a bell-crank or bell-cranks B) pulled at a home-signal position the screen S will be lowered to the position shown by dash-lines and the home semaphore $s^3$ alone will be exposed in line-clear position, and in like manner when the cord $s^{19}$ is, through the instrumentality of a bell-crank or bell-cranks B, pulled at a distant-signal position the distant semaphore $s^4$ will be put into line-clear position and at the same time, by means of the fixed bell-crank or equivalent, the screen S will be lowered to the position shown by dash-and-dot lines and both semaphores will be exposed, $s^3$ in danger position and $s^4$ in line-clear position.

We may employ separate dash-pots in connection with the screen S and each of the small semaphores $S^3$ and $S^4$, or we may employ the system of detents shown in the drawings and next hereinafter described, in which I', $I^2$, and $I^3$ are three detents fixed to the rod $i'$ by the spring $i^2$, kept in the position shown. The rod $i'$ is carried through the case of the apparatus and provided with a knob or handle $i^3$. The detents are so arranged that when the screen and semaphores are moved from their respective normal positions by the pulling of one or more of the cords $S^{13}$, $S^{15}$, $S^{17}$, and $S^{19}$ in manner hereinafter indicated the pins $i^4$ and $i^5$, fixed to the screen, and the pins $i^6$ and $i^7$, fixed to the semaphores $S^3$ and $S^4$, respectively, come into gear, as the case may be, with their respective detents, and so the screen and semaphores are respectively held in the position in which they were placed by the pulling of the cords in manner hereinafter described until they are released by the knob $i^3$ being pressed by the person reading the signal indicated. The detents are hinged at their ends, so that when struck by a falling pin they move, allowing it to pass, and immediately fall back by their own weight to the position shown in the drawings, but are prevented by guards from falling farther back. When the knob $i^3$ is pressed and the detents so released, the balance-weights, before mentioned, carried by the screen and small semaphores, cause the screen and small semaphores, as the case may be, to take up their normal positions, as shown in full lines.

It is obvious that if at a distant-signal position it be desired to give a repetition of the home signal in addition to the distant-signal there may be placed at the distant-signal position two bell-cranks B B, one of a throw corresponding to a distant signal and one of a throw corresponding to a home signal, and again in like manner when at such a position the cord $s^{19}$ is pulled through the instrumentality of a bell-crank or bell-cranks B the distant semaphore $s^4$ will be put into line-clear position, and at the same time by means of the fixed bell-crank or equivalent the screen S will be lowered to the position shown by dash-and-dot lines and both semaphores will be exposed, the semaphore $s^3$ (representing a home repeat-signal) in danger position and the semaphore $s^4$ (representing the distant signal) in line-clear position, and similarly when at such a position the cords $s^{19}$ and $s^{17}$ are pulled through the instrumentality of a bell-crank or bell-cranks B the distant semaphore $s^4$ and the home semaphore $s^3$ will both be put into line-clear position, and at the same time, by means of the fixed bell-crank or equivalent, the screen S will be lowered to the position shown by dash-and-dot lines and both semaphores will be exposed in line-clear position. Thus any of the usual signals or combinations of signals can be communicated to the driver by using the hereinbefore-described arrangements of bell-cranks, projecting pieces, and plunger apparatus to operate the mechanical devices shown in Fig. 4, as hereinbefore indicated. Now if the distance between successive pairs of bell-cranks A B in the neighborhood of both a distant and a home signal position be, as before described, less than the length of a contact-bar $c^4$ of a projecting piece C it follows that when an engine is brought to rest in the neighborhood of a series of pairs of bell-cranks A B the driver will know by means of signals, as hereinbefore explained, whether he is at a distant or home signal position, and, further, when the man in the box alters the lever to "line clear" the driver will at once receive the signal "line clear" by means of signals in the cab of the engine, as hereinbefore explained.

For the purpose of informing the man in the signal-box that he has moved the bell-cranks A and B into the desired positions an ordinary electric repeater, such as is employed in connection with the ordinary semaphore-signals, may be used and operated by the contact-arms $a'$ and $b^2$ of the bell-cranks A and B.

When the bell-cranks are operated by a lever which is also used to work ordinary semaphore-signals, in order that the man in charge may be able to readily put the signaling apparatus hereinbefore described out of and into action when it is desirable either not to use it or to use it, as in the case of a fog clearing off or coming on again, modified bell-cranks A′, Figs. 7, 8, and 9, can be used in lieu of the bell-cranks A hereinbefore described. In this modified form each bell-crank A′ consists of an upper portion 1 2 and a lower portion 3 4, both centered on the same pin 5. The upper portion 1 2 carries the contact-roller $a^4$, and the lower portion 3 4 is attached at 7 to the rod or link $a^3$, Fig. 2, connected with the arm $b'$ of the hereinbefore-mentioned corresponding bell-crank B. The upper portion 1 2 is capable, by means of a rod or wire attached to the arm 1, of being pushed or pulled over by the man in charge without affecting the lower portion 3 4. Thus the contact-rollers $a'$, which are normally used to communicate danger-signals, may be all fixed in such a position that they will not deflect the projecting piece C of a passing engine. On the other hand, when the wire attached to the arm 1 of each modified bell-crank A′ is not put in tension and each modified bell-crank A′ is allowed to remain in its normal condition (shown in Fig. 8) it becomes the equivalent of an ordinary bell-crank A and the system works in an analogous manner to that hereinbefore described with reference to the figures other than Figs. 7, 8, and 9.

When it is desired to make the system inoperative and to use only the ordinary semaphore-signals, the signal is first put in the danger position, then the lever in connection with the wire attached to the arms 1 is pulled over and fixed so that the contact-rollers $a^4$ are fixed in such a position that they will not deflect a projecting piece C of a passing engine, and finally the attachment of the rod or other equivalent $x$ to the lever, which also works the ordinary semaphore-signal, is undone, and the system, as is evident, thus becomes wholly inoperative. When it is desired to put the system in gear again, all that has to be done is to put the ordinary semaphore-signal at "danger," then make the attachment of the rod or other equivalent $x$ to the lever which works the ordinary semaphore-signal, and finally release the lever in connection with the wire attached to the arms 1, and the system, as is evident, will thus be made operative again.

This invention has been hereinbefore described as embodied in the form of a hanging bar on each side of the engine attached to two rocking levers; but it will be obvious that contact may be made between the engine and the operating-levers on the permanent way by an equivalent mechanism in any form having the necessary freedom of motion, provided that the surface - making contact be sufficiently extended longitudinally to bridge the interval measured along the permanent way between two successive levers or pairs of such levers.

Having now particularly described and ascertained the nature of this invention and in what manner the same is to be performed, we declare that what we claim is—

1. The combination of signal mechanism on a railway-engine with two projecting pieces controlling the signal mechanism and carried, the one on one side, and the other on the other side, of the engine, and each provided with an extended surface for making contact with bell-crank-operating levers, as A, B, and a pair, or series of pairs, of said bell-cranks on the permanent way, one bell-crank of each pair capable of operating one of the projecting pieces and the other bell-crank of each pair capable of operating the other projecting piece, substantially as and for the purpose described.

2. The combination of signal mechanism on an engine with two projecting pieces controlling the signal mechanism and carried the one on one side, the other on the other side, of the engine, and each provided with an extended surface for making contact with the bell-crank-operating levers A' B, and a pair, or a series of pairs of bell-cranks A' B on the permanent way, one bell-crank A' of each pair capable of operating one of the projecting pieces, and the other bell-crank B of each pair capable of operating the other projecting piece, substantially as and for the purposes described.

3. The combination of signal mechanism on an engine with two projecting pieces carried the one on one side, and the other on the other side, of the engine and each provided with an extended surface for making contact with bell-crank-operating levers as A B, a pair, or a series of pairs, of said bell-cranks on the permanent way, one bell-crank of each pair capable of operating one of the projecting pieces, and the other bell-crank B, capable of operating the other projecting piece, together with plunger apparatus, as D, one or more working in connection with each projecting piece to actuate the signal mechanism, substantially as and for the purposes described.

4. The combination of a signal mechanism on an engine with two projecting pieces carried one on one side, the other on the other side, of the engine, and each provided with an extended surface for making contact with the bell-crank-operating levers A' B, a pair, or a series of pairs, of bell-cranks A' B, on the permanent way, one bell-crank A' capable of operating one of the projecting pieces, and the other bell-crank B, capable of operating the other projecting piece, together with plunger apparatus as D, one or more working in connection with each projecting piece to actuate the signal mechanism, substantially as and for the purposes described.

5. The combination of a signal mechanism on an engine with projecting pieces on the engine, movable levers on the permanent way to act on said projecting levers and plunger apparatus operated by the projecting pieces to actuate by different lengths of movement different signals on the engine, substantially as described.

6. The combination with signaling apparatus and contact-making surface, on an engine of the type hereinbefore described, of a series of pairs of bell-crank-operating levers along the permanent way to actuate the signaling apparatus, and arranged in series and at such intervals that the contact-making surface carried by the engine shall, in passing such operating-levers, retain contact with every such operating-lever until it has made contact with the next in succession in the series, for the purpose described.

7. The combination with the bell-cranks on the permanent way operated by the semaphore-signal mechanism, and the elongated contact projections on the engine as described, of two semaphore, or like signaling, devices on the engine, a screen normally obstructing from view the said semaphores, or the like, and means whereby the screen is, through the medium of the elongated contact projections, moved so as to expose to view one, or both, of the said semaphores or the like, to indicate accordingly whether the engine be in the neighborhood of the distant signal, or the home signal, on the permanent way, the semaphores, or the like, on the engine, being at the same time, and by the same means, caused to indicate whether the line be clear, or blocked; substantially as hereinbefore described.

In testimony whereof we have signed this specification in the presence of two subscribing witnesses.

WILLIAM PATRICK MARA.
EDWARD HERBERT COZENS-HARDY.

Witnesses:
WILLIAM FREDERICK UPTON,
JOHN EDWARD NEWTON.